United States Patent [19]

Kao et al.

[11] 4,087,156

[45] May 2, 1978

[54] OPTICAL FIBER TRANSMISSION MIXER AND METHOD OF MAKING SAME

[75] Inventors: Charles K. Kao; James E. Goell, both of Roanoke, Va.

[73] Assignee: International Telephone & Telegraph Corporation, Nutley, N.J.

[21] Appl. No.: 630,118

[22] Filed: Nov. 7, 1975

[51] Int. Cl.² ............................................. G02B 5/16
[52] U.S. Cl. ............................. 350/96.21; 350/96.15
[58] Field of Search ..................... 350/96 C, 96 B; 250/227

[56] References Cited

U.S. PATENT DOCUMENTS

| | | | |
|---|---|---|---|
| 3,508,589 | 4/1970 | Derick et al. | 350/96 B X |
| 3,883,217 | 5/1975 | Love et al. | 350/96 C |
| 3,902,786 | 9/1975 | Brown | 350/96 C |
| 3,912,362 | 10/1975 | Hudson | 350/96 B |
| 3,933,455 | 1/1976 | Chown | 350/96 C X |

*Primary Examiner*—David H. Rubin
*Attorney, Agent, or Firm*—John T. O'Halloran; Peter C. Van Der Sluys

[57] ABSTRACT

Methods and materials are disclosed for providing an optical fiber transmission mixer wherein the cladding material is removed from an intermediate region of a plurality of fibers and the exposed fiber cores are encapsulated in a matching or slightly higher refractive index material. The encapsulated intermediate region of the fibers is then enclosed in a low index sheath to prevent light from escaping from the mixer.

15 Claims, 4 Drawing Figures

OPTICAL FIBER TRANSMISSION MIXER AND METHOD OF MAKING SAME

BACKGROUND OF THE INVENTION

Transmission mixers are employed in optical communication systems when it is desired to transmit the information from one fiber to a plurality of fibers. Mixers are currently available for fiber bundles and generally consist of a mixer rod consisting of a high index of refraction material and containing a low refractive index cladding. A number of optical fiber bundles are attached to each end of the mixer rod to provide optical interconnection between one of the fiber bundles on one side of the rod and all the fiber bundles on the opposite side.

The use of a solid mixer rod for interconnecting between a plurality of input and output fiber bundles results in a certain amount of non-uniformity in the light distribution and light loss due to relatively inconsistent light coupling and mixer losses in a rod of sufficient length.

The purpose of this invention is to provide a transmission mixer having improved light coupling efficiency between the optical fibers and the mixer as well as improved intercoupling efficiency and better uniformity between the individual fibers themselves.

SUMMARY OF THE INVENTION

An optical fiber transmission mixer comprises a plurality of finite lengths of optical fibers having an intermediate region of their cladding removed and replaced by an encapsulating material of matching or slightly high refractive index. The encapsulating material is in turn enclosed within a layer of material having a lower refractive index.

One embodiment comprises silica core fibers having a plastic cladding layer where a region of plastic cladding is removed from each of the fibers. The stripped core region is then closely and linearly or closely and spirally laid and encapsulated within a material having a matching or slightly higher refractive index than the silica. The encapsulating material in turn is provided with a coating of low refractive index material to promote the internal reflection of light within the mixer.

A further embodiment comprises a plurality of optical fibers each having a doped silica core and a layer of cladding glass. In this embodiment the cladding glass is removed by etching prior to encapsulating in a matching or slightly higher index material. The encapsulating material is in turn enclosed in a thin layer of low refractive index material.

DESCRIPTION OF THE PREFERRED EMBODIMENT

Figure 1:
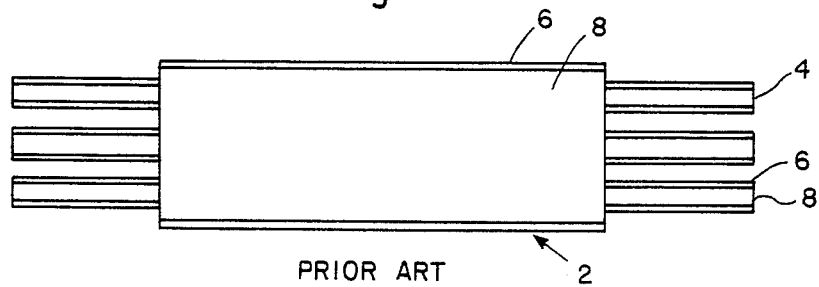
FIG. 1 is a side sectional view of a prior art mixer rod.

FIG. 1 shows an optical mixer rod 2 of the prior art consisting of a solid core region 8 and a cladding layer 6. A number of optical fiber bundles are attached to each side of the mixer rod 2 by an epoxy adhesive or a similar bonding material. Although a plurality of fiber bundles is generally used with the mixer rod of the prior art one fiber 4 from each of several bundles is shown for the purpose of clarity only. Each of the optical fibers 4 has a light transmitting core region 8 covered by a cladding layer 6 as is generally known in the art. The purpose of the mixer rod 2 is to enable optical communication entering any individual fiber 4 to be transmitted through the mixer 2 for providing communication with all the fibers 4 in the opposite end of the mixer rod 2.

For the purpose of this disclosure one side of the mixer rod 2 can be considered as the output and the opposite side can be considered the input side of the mixer. When light energy enters the mixer by connecting a source of light to any one of the input fibers, the light entering the core region 8 is contained within the mixer 2 by multiple internal reflections with the cladding layer 6 until the internally trapped light exits through the fibers 4 on the output side of the mixer rod 2. By this method a single input fiber bundle can correspondingly transmit information to a large number of output fiber bundles.

Figure 2:
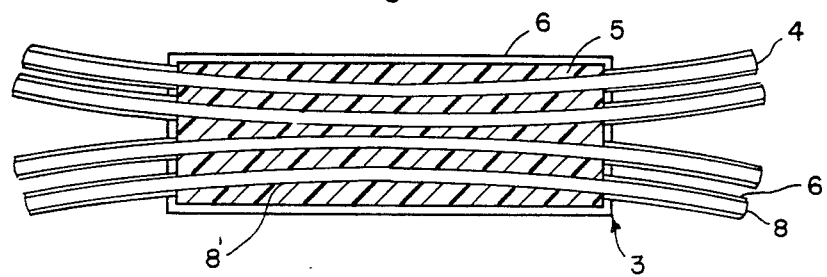
FIG. 2 is a side sectional view of the transmission mixer of this invention.
Figure 3A:
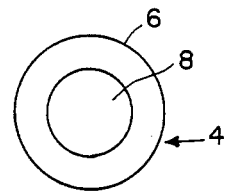
FIG. 3A is an end view of one type of optical fiber used within the mixer of FIG. 2.

FIG. 2 shows a transmission mixer 3 according to this invention. In one embodiment a plurality of plastic coated silica fibers 4 are prepared by stripping away the plastic material and exposing the silica core 8. A cross-section of a typical plastic clad fiber is shown in FIG. 3A. The light transmissive core region 8 is provided by a high purity silica fiber which is subsequently coated with a plastic cladding 6 having a lower refractive index than the pure silica core 8. After stripping the plastic cladding 6 from an intermediate region of each of the fibers 4, the stripped cores 8' of each of the fibers 4 is then consolidated and encapsulated in a plastic material 5 having an index of refraction equal to or slightly greater than the index of refraction of silica. This is to ensure that light entering the core 8 of any of the input optical fibers 4 will readily transfer between all the silica core material 8 of the outgoing optical fibers 4. An outer cladding layer 6 of a lower index of refraction material than the encapsulating material 5 is placed over the encapsulating material 5 to prevent light from leaving the mixer 3 by the mechanism of total internal reflection. Silicon resin is used for the outer cladding layer 6 for this embodiment because of its low refractive index properties and its resistance to moisture penetration. Although silicon resin is chosen for the outer cladding layer 6 and plastic is chosen as the encapsulating material 5 other combinations of materials can be employed providing the index of refraction of the cladding material 6 is less than the index of refraction of the encapsulating material 5 and the index of refraction of the encapsulating material 5 is equal to or slightly greater than the index of refraction of the core material 8. Consolidating the stripped cores to close proximity promotes better mixing between the fiber cores. Further mixing can also occur if the fiber cores are brought close together and twisted before encapsulation.

Figure 3B:
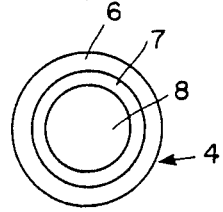
FIG. 3B is an end view of another type of optical fiber used within the mixer of FIG. 2.

Although plastic-clad silica core fibers as described in FIG. 3A provide convenient means for forming the inventive transmission mixer 3 depicted in FIG. 2 other optical fiber compositions can also be employed. FIG. 3B shows an optical fiber 4 having a doped silica core 8, surrounded by a doped silica cladding 7 and enclosed in an outer plastic cladding 6. When an optical fiber having the configuration of FIG. 3B is used for constructing the transmission mixer 3, according to this invention, the doped silica cladding layer 7 is removed along with the plastic cladding layer 6. This is to ensure that the light transmitted into the core of any of the input fibers 4 will readily transmit through the corresponding stripped cores 8' directly into the encapsulation material 5. The presence of the intermediate doped silica cladding 7 would prevent the light from escaping from the core 8 by the mechanism of total internal reflection as described earlier. When the doped silica core 8 of the embodiment of FIG. 3B consists of germanate glass, and the doped silica cladding 7 consists of a borosilicate glass, the borosilicate glass can be removed by a suitable etchant such as hydrofluoric acid.

Although methods and materials are disclosed for providing a transmission mixer for optical communication purposes, this is by way of example only. The invention provides convenient methods and materials for transmitting light from a single fiber to a plurality of fibers wherever such application may be required.

What is claimed is:

1. A method for providing an integral optical transmission mixer having improved coupling efficiency comprising the steps of:
    stripping a section of plastic cladding material from a plurality of plastic clad silica core optical fibers intermediate the fiber ends to expose the silica cores having a first index of refraction;
    placing said exposed silica cores in close proximity with each other to promote optical transfer between the exposed cores;
    encapsulating the exposed cores in a material having an index of refraction greater than the cladding material, and
    covering the encapsulated fiber region with a layer of material having a lower refractive index than the encapsulating material.

2. The method of claim 1 wherein the encapsulating material has a higher refractive index than the core material.

3. The method of claim 1 wherein the encapsulating material has an index of refraction equal to the core material.

4. The method of claim 1 wherein the encapsulating material comprises a plastic.

5. The method of claim 1 wherein the encapsulating material comprises a silicone resin.

6. The method of claim 1 wherein the material covering the encapsulated fibers comprises plastic.

7. The method of claim 1 wherein the material covering the encapsulated fibers comprises a silicone resin.

8. The mixer of claim 1 further including the step of twisting the exposed fiber cores before encapsulation.

9. An integral optical transmission mixer having improved optical coupling efficiency comprising:
    a plurality of optical fibers each having a light transmissive core of a first index of refraction and a light reflective cladding of lower refractive index than said core;
    a region intermediate the ends of said fiber wherein said cladding is absent from each of said fibers and wherein said fibers are in close proximity to each other to promote efficient optical transfer between each of the fibers;
    an encapsulating material having an index of refraction greater than or equal to said first index of refraction enclosing the cores of said fibers within said intermediate region; and
    an outer cladding layer of lower refractive index than said encapsulating material enclosing said encapsulating material whereby light entering any individual fiber is transmitted to the remaining fibers.

10. The mixer of claim 9 wherein said plurality of fibers comprise a corresponding plurality of input and output fiber ends on either side of said intermediate region whereby light entering one of said input fiber ends becomes transmitted to each of said output fiber ends.

11. The mixer of claim 10 wherein said encapsulating material has an index of refraction greater than said core material.

12. The mixer of claim 9 wherein said encapsulating material has an index of refraction equal to said core material.

13. The mixer of claim 9 wherein said outer cladding layer has a lower refractive index than said encapsulating material.

14. The mixer of claim 9 wherein said encapsulating material comprises a plastic.

15. The mixer of claim 9 wherein said outer cladding layer comprises a silicone resin.

* * * * *